United States Patent
Oh et al.

(10) Patent No.: US 7,593,178 B2
(45) Date of Patent: Sep. 22, 2009

(54) METHOD OF REDUCING ABRASION OF DISK BY USING DITHERING PROCESS AND DISK DRIVE USING THE SAME

(75) Inventors: Kyoung-whan Oh, Gwanak-gu (KR); Bong-jin Lee, Tongyeong-si (KR)

(73) Assignee: Samsung Electronics Co., Ltd., Suwon-si, Gyeonggi-do (KR)

( * ) Notice: Subject to any disclaimer, the term of this patent is extended or adjusted under 35 U.S.C. 154(b) by 0 days.

(21) Appl. No.: 12/044,173

(22) Filed: Mar. 7, 2008

(65) Prior Publication Data

US 2008/0225429 A1    Sep. 18, 2008

(30) Foreign Application Priority Data

Mar. 13, 2007   (KR)   ...................... 10-2007-0024677

(51) Int. Cl.
*G11B 21/02*   (2006.01)
(52) U.S. Cl. ........................................................ 360/75
(58) Field of Classification Search ...................... None
See application file for complete search history.

(56) References Cited

U.S. PATENT DOCUMENTS

| | | | |
|---|---|---|---|
| 5,384,675 A * | 1/1995 | Crawforth et al. ............. | 360/75 |
| 5,982,571 A * | 11/1999 | Calfee et al. .................. | 360/70 |
| 6,002,549 A | 12/1999 | Berman et al. | |
| 6,018,432 A * | 1/2000 | Ukani .......................... | 360/69 |
| 6,785,083 B2 * | 8/2004 | Sloan et al. .............. | 360/77.02 |
| 6,882,495 B2 | 4/2005 | Duvall et al. | |
| 2002/0018313 A1 | 2/2002 | Moon et al. | |
| 2003/0107835 A1 | 6/2003 | Duvall et al. | |

FOREIGN PATENT DOCUMENTS

| | | |
|---|---|---|
| GB | 2166279 A | 4/1986 |
| JP | 2005149656 | 6/2005 |
| KR | 1020050052600 A | 6/2005 |

* cited by examiner

*Primary Examiner*—Andrew L Sniezek
(74) *Attorney, Agent, or Firm*—Volentine & Whitt, PLLC

(57) ABSTRACT

Embodiments of the invention reduce abrasion of a disk via a dithering process that spreads a friction area between a magnetic head and the disk when a magnetic head lifts from the surface of the disk. In embodiments of the invention, the dithering process is executed only when the magnetic head is latched in a parking zone of the disk and when a disk spindle motor is in an acceleration mode.

18 Claims, 10 Drawing Sheets

C

C

METHOD OF REDUCING ABRASION OF DISK BY USING DITHERING PROCESS AND DISK DRIVE USING THE SAME

CROSS-REFERENCE TO RELATED PATENT APPLICATION

This application claims the benefit of Korean Patent Application No. 10-2007-0024677, filed on Mar. 13, 2007, in the Korean Intellectual Property Office, the disclosure of which is incorporated herein in its entirety by reference.

BACKGROUND OF THE INVENTION

1. Field of the Invention

The present invention relates to a method and apparatus for controlling a motor, and more particularly but without limitation, to a method and apparatus for controlling a voice coil motor so as to reduce abrasion of a disk when a magnetic head of a disk drive lifts from the surface of the disk.

2. Description of the Related Art

In general, a hard disk drive is a type of data storage device that contributes to an operation of a computer system by recording or reproducing data onto the disk using a magnetic head. As the storage capacity increases and the size of hard disk drives decreases, the number of bit per inch (BPI) (recording density in a rotational direction of the disk) and track per inch (TPI) (recording density in a radial direction of the disk) increase. Accordingly, increasingly accurate magnetic head mechanisms are required.

When a hard disk drive starts to operate or when a hard disk drive stops operation, the magnetic head is positioned in a parking zone located in an inner zone of the disk. That is, taking off and landing of the magnetic head is repeatedly performed at the same location. Since the taking off and landing of the magnetic head is repeatedly performed at the same location of the disk, as shown in FIG. 1, abrasion of the disk surface occurs at the parking zone.

Moreover, as the storage capacity of the disk drive increases, the number of disks mounted on the disk drive may increase. Since an acceleration time of the spindle motor increases due to the increased number of the disks, the abrasion of the disk when the magnetic head rises becomes more serious. Methods and apparatuses that reduce such abrasion are needed.

SUMMARY OF THE INVENTION

Embodiments of the invention reduce abrasion of a disk via a dithering process that spreads a friction area between a magnetic head and the disk when a magnetic head lifts from the surface of the disk. In embodiments of the invention, the dithering process is executed only when the magnetic head is latched in a parking zone of the disk and when a disk spindle motor is in an acceleration mode.

According to an aspect of the present invention, there is provided a method for controlling a magnetic head of a disk drive, including: determining whether the disk drive is switched to a spindle motor driving mode; determining whether a spindle velocity is within a predetermined velocity range; and activating a dithering mode if it is determined that the disk drive is switched to the spindle motor driving mode and if it is determined that the spindle velocity is within the predetermined velocity range, the dithering mode alternatively driving the magnetic head in an inner direction and an outer direction with respect to a disk of the disk drive.

According to another aspect of the present invention, there is provided a disk drive including: a disk that includes a parking zone and a data zone; a magnetic head intermittently coupled to the disk, the magnetic head configured to write information in the data zone of the disk or read information from the data zone of the disk; a voice coil motor coupled to the magnetic head and configured to position the magnetic head with respect to the disk; a latch unit coupled to the magnetic head, the latch unit configured to constrain the magnetic head to the parking zone of the disk in a latch mode; a controller coupled to the magnetic head and the voice control motor, the controller configured to generate a dithering control signal for alternately moving the magnetic head in an inner direction and an outer direction with respect to the disk when the magnetic head is in the latch mode and when a rotational velocity of the disk is in a predetermined range during acceleration of the disk; and a voice coil motor driving unit coupled between the controller and the voice control motor, the voice control driving unit configured to generate a voice coil motor driving current based on the dithering control signal.

According to another aspect of the present invention, there is provided a computer-readable recording medium having embodied thereon a computer program for executing a method of reducing abrasion of a disk using a dithering process.

BRIEF DESCRIPTION OF THE DRAWINGS

The above and other features and advantages of the present invention will become more apparent by describing in detail exemplary embodiments thereof with reference to the attached drawings in which.

DETAILED DESCRIPTION OF THE INVENTION

The attached drawings for illustrating exemplary embodiments of the present invention are referred to in order to gain a sufficient understanding of the present invention, the merits thereof, and the objectives accomplished by the implementation of the present invention.

Hereinafter, exemplary embodiments of the present invention will be described in detail with reference to the attached drawings.

Figure 1:
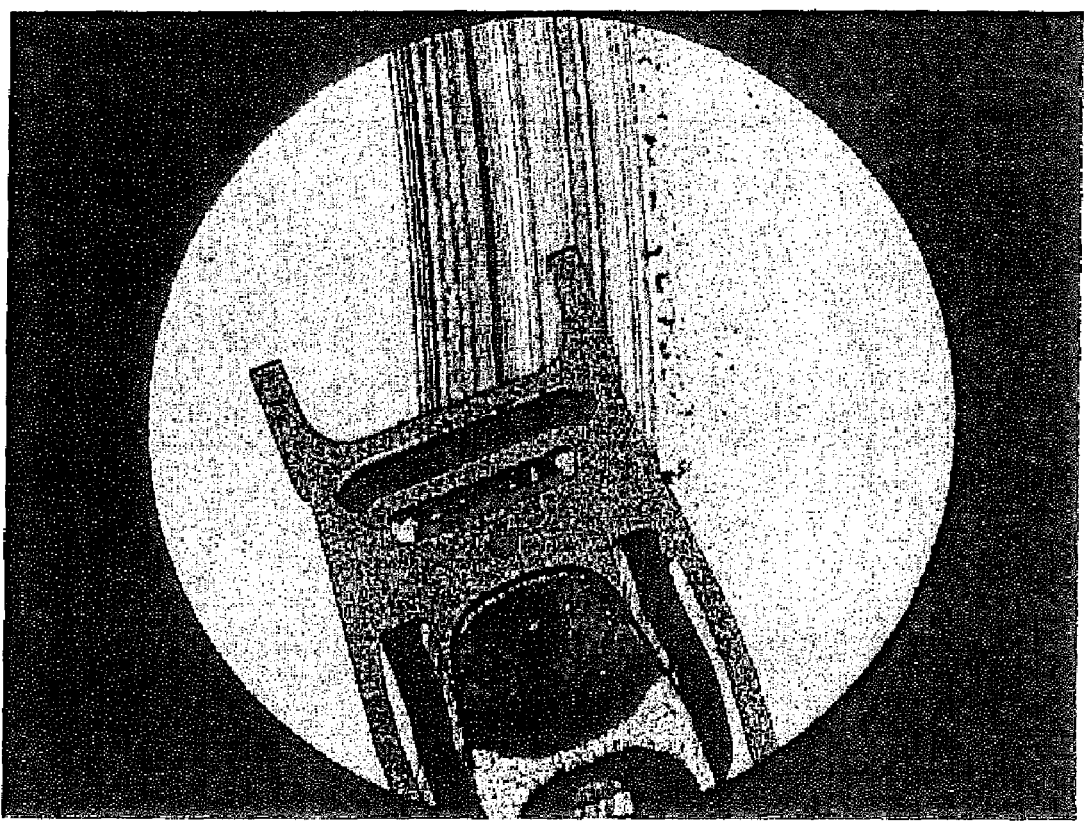
FIG. 1 illustrates an abrasion state of a disk when a magnetic head rises according to a conventional technique.
Figure 2:
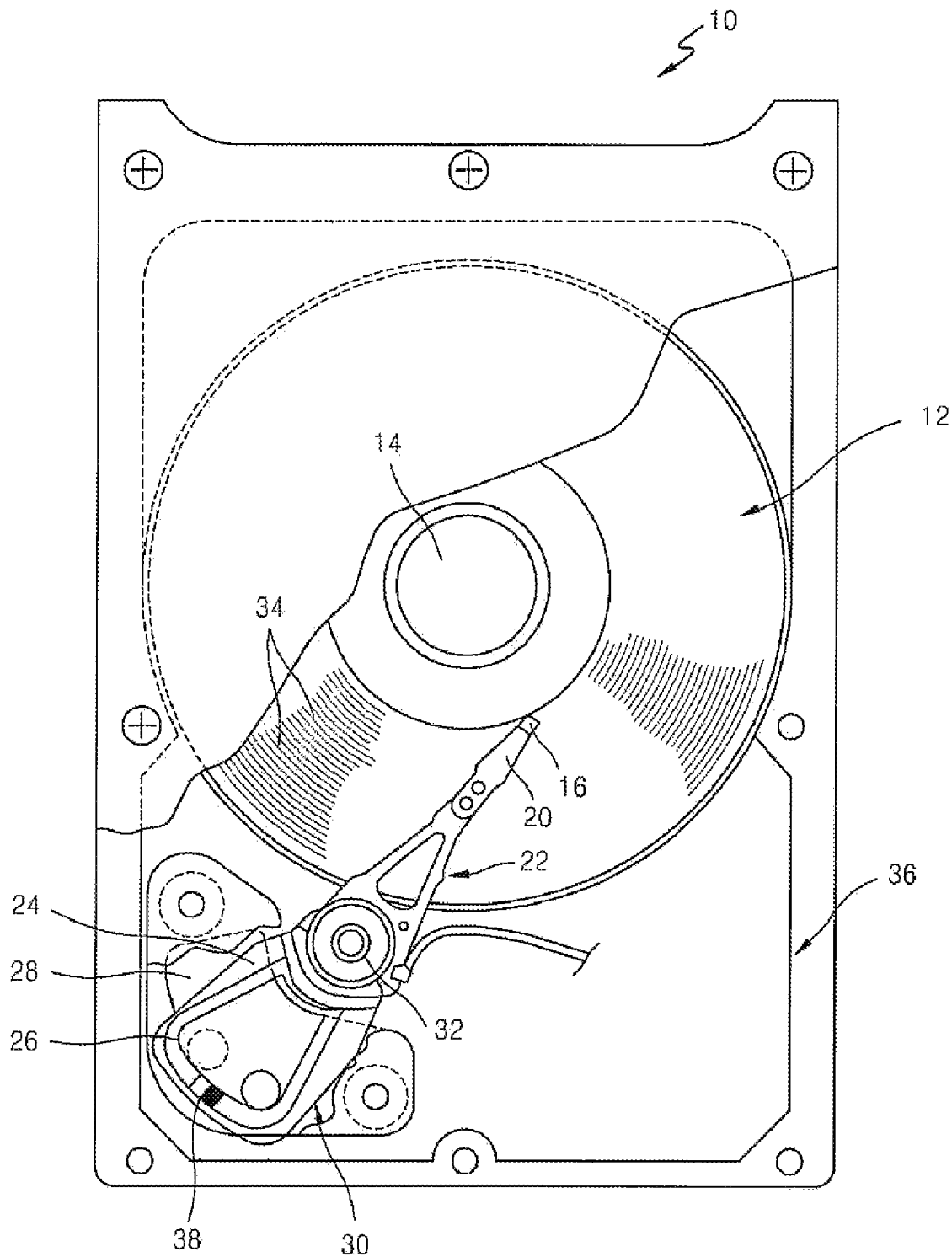
FIG. 2 is a top plan view of a disk drive according to an embodiment of the present invention.

FIG. 2 illustrates a mechanical structure of a hard disk drive 10 according to an embodiment of the present invention. The disk drive 10 includes at least one magnetic disk 12 rotated by a spindle motor 14. The disk drive 10 also includes a magnetic head 16 adjacent to the surface of the disk 12.

The magnetic head 16 reads information from the rotating disk 12 by sensing a magnetic field of the disk 12 and/or writes information onto the disk by magnetizing the disk 12.

The magnetic head 16 may be integrated in a slider 20. The slider 20 has a structure which generates an air bearing between surfaces of the magnetic head 16 and the disk 12. The slider 20 is combined with a head gimbal assembly 22. The head gimbal assembly 22 is adhered to an actuator arm 24 including a voice coil 26. The voice coil 26 is adjacent to a magnetic assembly 28 so as to constitute a voice coil motor (VCM) 30. A current supplied to the voice coil 26 generates torque which rotates the actuator arm 24 with respect to a bearing assembly 32. The magnetic head 16 is moved across the surface of the disk 12 due to the rotation of the actuator arm 24.

Information is typically stored in annular tracks 34 of the disk 12. Each track 34 includes a plurality of sectors. Each sector includes a data field and an identification field. The identification field is constructed with gray codes for identifying sectors and tracks (cylinders).

The disk 12 is constructed with a data zone onto which data is recorded and a parking zone. When the disk drive is not in operation, the magnetic head 16 is parked in the parking zone. The parking zone is located near the central portion of the disk 12. When the disk 12 starts to rotate, the magnetic head 16 starts to rise from the disk.

Figure 12:
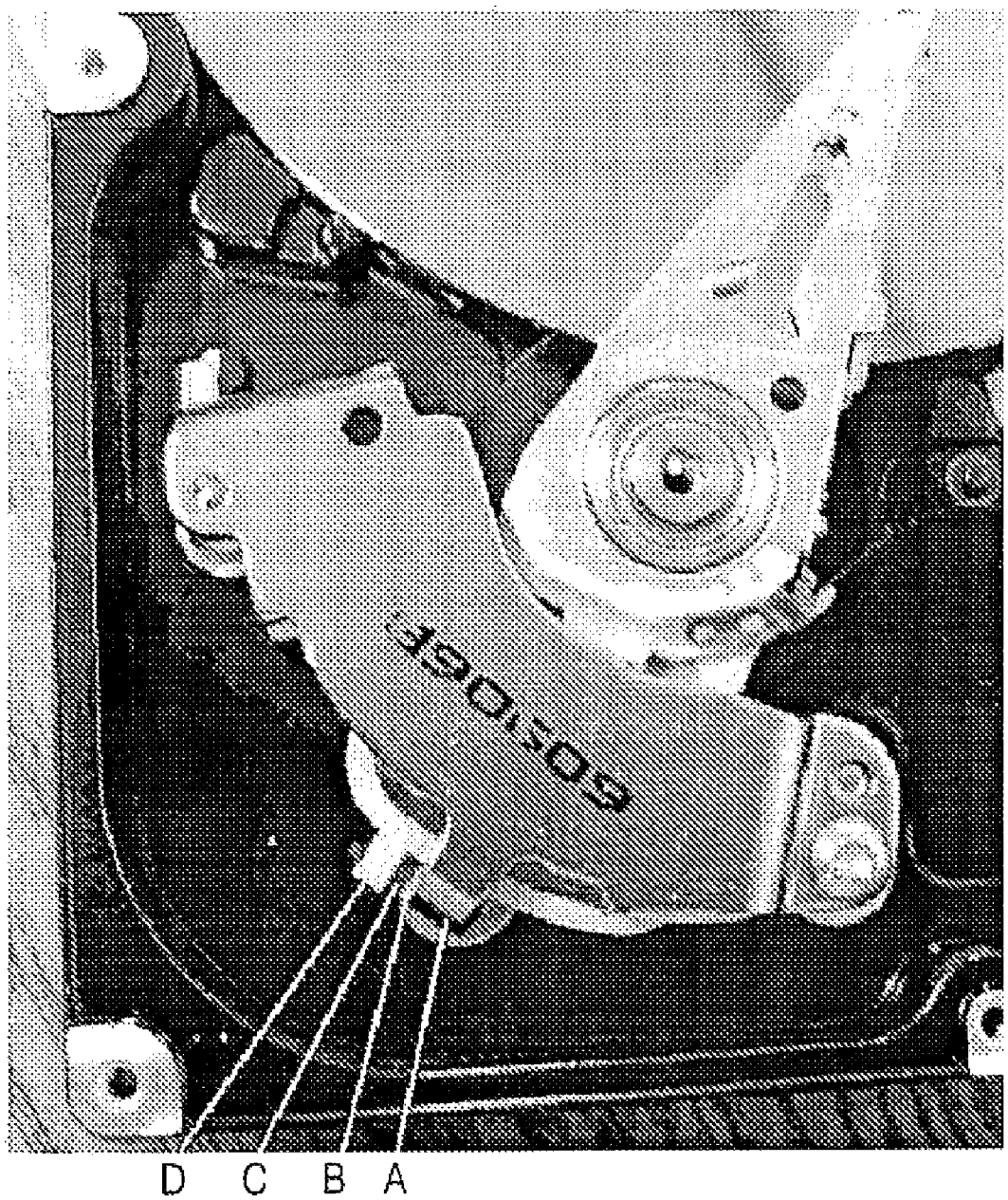
FIG. 12 illustrates a practical structure of a latch unit 38 shown in FIG. 2, according to an embodiment of the present invention.

A latch unit 38 serves to safely fix the magnetic head 16 when the magnetic head 16 is parked in the parking zone of the disk 12. As shown in FIG. 12, the latch unit 38 has a structure in which a metal protrusion B is combined with one side D of the actuator arm 24 by inserting a rubber portion C therebetween, and in which the metal protrusion B is latched onto a supporter A formed of a magnetic substance and fixed to a base by magnetic force.

Figure 3:
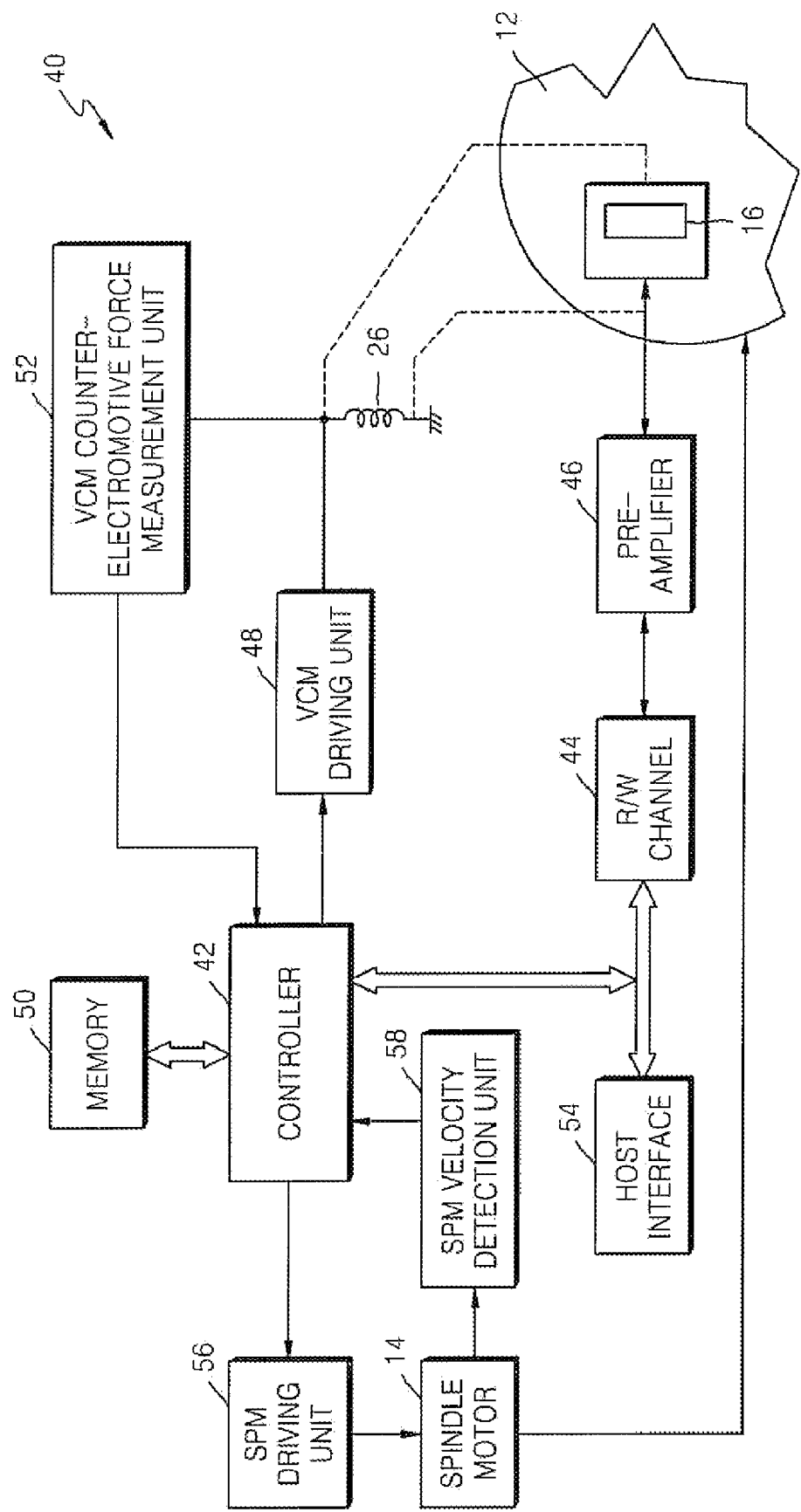
FIG. 3 is a block diagram of a disk drive according to an embodiment of the present invention.

FIG. 3 is a block diagram of a disk drive according to an embodiment of the present invention An electrical system 40 includes a controller 42 connected to the magnetic head 16 through a read/write (R/W) channel circuit 44 and a pre-amplifier circuit 46. In addition, the electrical system 40 includes a VCM counter-electromotive force measurement unit 52 which is connected to the controller 42 to measure counter-electromotive force generated in a coil 26 of the VCM 30.

The controller 42 may be, for example, a digital signal processor (DSP), microprocessor, or microcontroller. The controller 42 controls the R/W channel circuit 44 so as to read information from the disk 12 or write information onto the disk.

The controller 42 is also coupled to a VCM driving unit 48 that is configured to supply a driving current to the voice coil 26 and to a spindle motor (SPM) driving unit 56 that is configured to supply a driving current to the spindle motor 14. The controller 42 supplies a control signal to the VCM driving unit 48 so as to control excitation of the VCM and motion of the magnetic head 16. In addition, the controller 42 generates a dithering control signal to the VCM driving unit 48 for alternately moving the magnetic head 16 in a direction towards a central portion of the disk 12 (hereinafter referred to as inner direction) and in a direction towards a circumference of the disk 12 (hereinafter referred to as outer direction). The controller 42 generates the dithering control signal only at predetermined conditions, for example when the magnetic head 16 is latched in the parking zone of the disk 12, and when the SPM 14 rotates within a predetermined velocity range while the SPM 14 is driven.

In addition, the controller 42 is coupled to a SPM velocity detection unit 58 that is configured to measure a velocity of the spindle motor 14. For example, the SPM velocity detection unit 58 can calculate the velocity of the SPM 14 by detecting counter-electromotive force generated in the SPM 14.

The controller 42 is also coupled to memory 50. Firmware for controlling the disk drive and various control data are stored in a memory 50. The controller 42 is configured to read and execute the firmware, program codes, or other software in memory 50. Program codes for executing methods shown in FIGS. 5 and 6 below may be stored in the memory 50 or in other controller-readable storage media. In alternative embodiments, however, the methods in FIGS. 5 and 6 may be implemented via hardware, software, or a combination of hardware and software, according to design choice.

General operations of the disk drive will now be described.

In a read mode, the disk drive 10 amplifies an electrical signal sensed from the disk 12 by the magnetic head 16 by using the pre-amplifier circuit 46. Then, the R/W channel circuit 44 encodes a signal read from the disk 12 according to a timing of a sector pulse for a reading operation, which is generated by the controller 42, into a digital signal. The R/W channel circuit 44 further transforms the read signal into stream data, and transmits the stream data to a host device (not shown) through a host interface circuit 54.

In a write mode, the disk drive 10 receives data from the host device through the host interface circuit 54 and temporarily stores the received data in an inner buffer (not shown) of the host interface circuit 54. The disk drive 10 sequentially outputs the data stored in the buffer, transforms outputted data into a binary data stream suitable for a writing channel of the disk by using the R/W channel circuit 44, and writes data onto the disk 12 by applying a writing current amplified by the pre-amplifier circuit 46 to the magnetic head 16, when the sector pulse for the writing operation is generated.

A dithering process performed when the SPM 14 is driven will now be described in time sequence with reference to flowcharts in FIGS. 5 and 6.

First, a method of reducing abrasion of a disk by using a dithering process according to a first embodiment of the present invention will be described with reference to the flowchart of FIG. 5.

When a disk drive does not operate (e.g., in a read or write operation), the disk drive is switched to a parking mode. In the parking mode, the magnetic head 16 is moved to the parking zone of the disk 12, and the disk 12 stops its rotation. In the parking mode, in order to allow the disk drive to operate, the disk drive is switched to a SPM driving mode in which the SPM 14 is driven.

First, the controller 42 determines whether the disk drive is switched to the SPM driving mode (operation S501). In the SPM driving mode, the controller 42 generates a SPM driving control signal. The SPM driving unit 56 generates a SPM driving current in response to the SPM driving control signal and applies the SPM driving current to the SPM 14. Accordingly, the disk 12 starts to rotate. After the disk drive is switched to the SPM driving mode, the SPM is accelerated to reach a target rotational velocity.

When it is determined in operation S501 that the disk drive is not in the SPM driving mode, the dithering process terminates. When it is determined in operation S501 that the disk drive is in the SPM driving mode, the disk drive 10 detects the SPM velocity SPM-rpm (operation S502). The SPM velocity is calculated by the SPM velocity detection unit 58. For example, the SPM velocity detection unit 58 can calculate the SPM velocity by detecting counter-electromotive force of the SPM 14.

Next, the controller 42 compares the SPM velocity SPM-rpm detected in operation S502 with a first threshold velocity TH1 (operation S503). Here, the first threshold velocity TH1 indicates a lower limit of the SPM velocity in which the dithering process can start. In a case where the first threshold velocity TH1 is set to zero, the dithering process starts when the SPM 14 starts to rotate. However, the greatest frictional force is generated between the magnetic head 16 and the disk 12 when the SPM 14 starts to be driven. Accordingly, it may be preferable to set the first threshold velocity TH1 to a value greater than zero. For example, the first threshold velocity may be set to 20% of a target velocity of the SPM 14. The present invention is not limited thereto. As such, the first threshold TH1 may be set to any predetermined value.

When the SPM velocity SPM-rpm is determined in step S503 to be less than the first threshold velocity TH1, the process returns to operation S502. However, when it is determined in operation S503 that the SPM velocity SPM-rpm is equal to or greater than the first threshold velocity TH1, operation S504 is performed.

The controller 42 compares the SPM velocity SPM-rpm detected in operation S502 with a second threshold velocity TH2 (operation S504). Here, the second threshold velocity TH2 indicates an upper limit of the SPM velocity at which the VCM dithering process is terminated. It is preferable to set the second threshold velocity TH2 to a velocity at which lift of the magnetic head 16 from the surface of the disk 12 occurs. For example, the second threshold velocity may be set to 90% of the target velocity of the SPM 14. The present invention is not limited thereto. As such, the second threshold TH2 may be set to any predetermined value.

When it is determined in operation S504 that the SPM velocity SPM-rpm is less than the second threshold velocity TH2, the VCM dithering mode is turned on (operation S505). Otherwise, the VCM dithering mode is turned off (operation S506). Operations S502 to S504 are performed by periodically returning to operation S502 while the dithering mode is turned on and the dithering process is executed. Accordingly, it is possible to determine a time when the dithering mode is to be turned off.

When the VCM dithering mode is turned on, the controller 42 generates a dithering control signal (VCM DAC signal) for executing the dithering process.

The VCM DAC signal may be, for example, a rectangular waveform signal, a triangular waveform signal, a sinusoidal waveform signal, a trapezoidal waveform signal, or the like.

Figure 7:
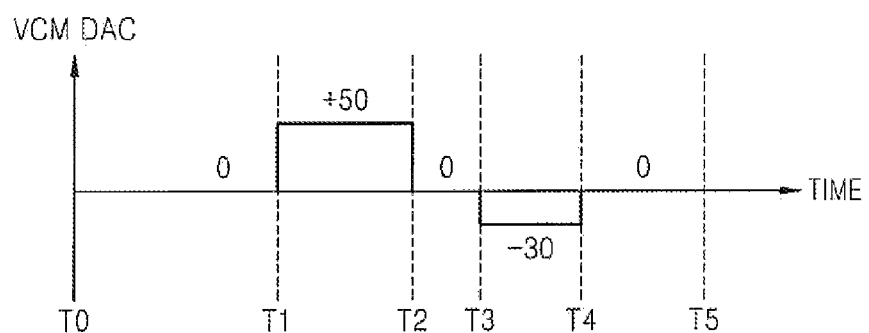
FIG. 7 is a timing diagram of a VCM DAC signal with a rectangular waveform applied to a dithering process according to an embodiment of the present invention.

FIG. 7 illustrates an example in which a rectangular signal is used as the VCM DAC signal.

In FIG. 7, T0 indicates a time when the SPM 14 starts to rotate. T1 indicates a time when the SPM velocity SPM_rpm reaches the first threshold velocity TH1. T4 indicates a time when the SPM velocity SPM_rpm reaches the second threshold velocity TH2. T5 indicates a time when the SPM velocity SPM_rpm reaches the target velocity Target_rpm. T2 indicates a time when an inner directional seek of the disk 12 is completed. T3 indicates a time when an outer directional seek of the disk 12 starts. Here, T2 and T3 may be defined as times when the SPM velocity SPM_rpm reaches predetermined velocities between the first and second threshold velocities TH1 and TH2. T2 and T3 may be set to times having a predetermined time interval with respect to T1.

For example, T1, T2, T3, and T4 may be respectively set to 20% of Target_rpm, 50% of Target_rpm, 60% of Target_rpm, and 90% of Target_rpm.

Alternatively, only T1 may be set to 20% of Target_rpm, and T2, T3, and T4 may be set to times having predetermined intervals with respect to T1.

In the above description, the section in which the dithering process is executed corresponds to a section between T1 and T4. In a section between T1 and T2, the magnetic head 16 is moved towards the central portion of the disk (also referred to as "inner direction"). In a section between T2 and T3, the magnetic head 16 stops moving. In a section between T3 and T4, the magnetic head 16 is moved towards the circumference of the disk (also referred to as "outer direction"). As shown in FIG. 7, in the dithering process according to an embodiment of the present invention, the magnetic head 16 is moved in the inner direction, so as to move the magnetic head 16 to the parking zone, when the magnetic head 16 is abnormally parked in the data zone of the disk.

An unlatching process is executed a predetermined time after the SPM 14 reaches the target velocity Target_rpm. Accordingly, the dithering process and the unlatch process are executed having a predetermined interval therebetween.

The amplitude of the VCM DAC signal in the dithering process is determined so that the magnetic head 16 is finely moved in consideration of a softness of the rubber portion C of the latch unit 38 while the magnetic head 16 is not unlatched from the parking zone of the disk 12. When the amplitude of the VCM DAC signal is set to be too large in the dithering process, the magnetic head 16 is unlatched during the dithering process. On the other hand, when the amplitude of the VCM DAC signal is set to be too small, the magnetic head 16 hardly moves. Accordingly, the amplitude of the VCM DAC signal may be set by considering the force necessary to maintain the latch state based on the softness of the rubber portion C of the latch unit 38.

The aforementioned VCM DAC signal is applied to the VCM driving unit 48. The VCM driving unit 48 generates a current corresponding to the amplitude of the VCM DAC signal and applies the generated current to the voice coil 26 of the VCM 30. Accordingly, the magnetic head 16 is finely moved in the outer or inner direction of the disk 12 while maintaining the state in which the magnetic head 16 is latched onto the parking zone of the disk 12.

Figure 8:
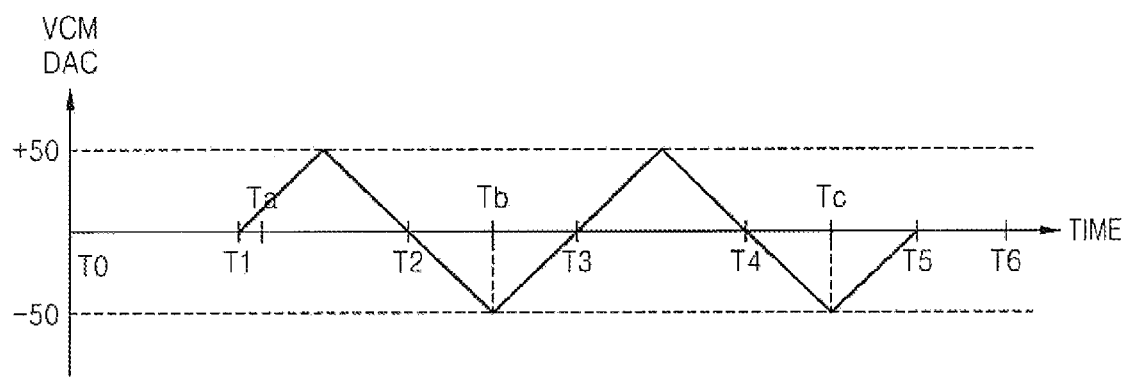
FIG. 8 is a timing diagram of a VCM DAC signal with a triangular waveform applied to a dithering process according to an embodiment of the present invention.
Figure 9:
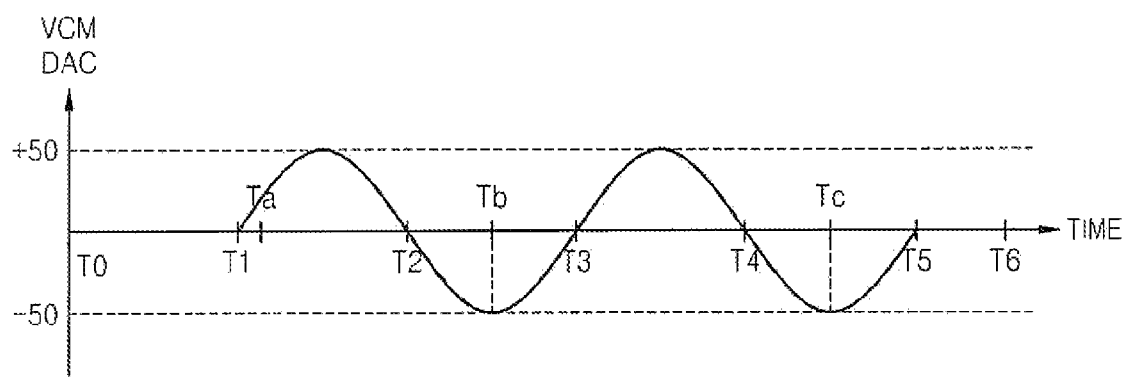
FIG. 9 is a timing diagram of a VCM DAC signal with a sinusoidal waveform applied to a dithering process according to an embodiment of the present invention.

Examples in which triangular and sinusoidal signals are used as the VCM DAC signal are illustrated in FIGS. 8 and 9. Detailed description on FIGS. 8 and 9 will be provided with reference to the flowchart of FIG. 6.

Figure 6:
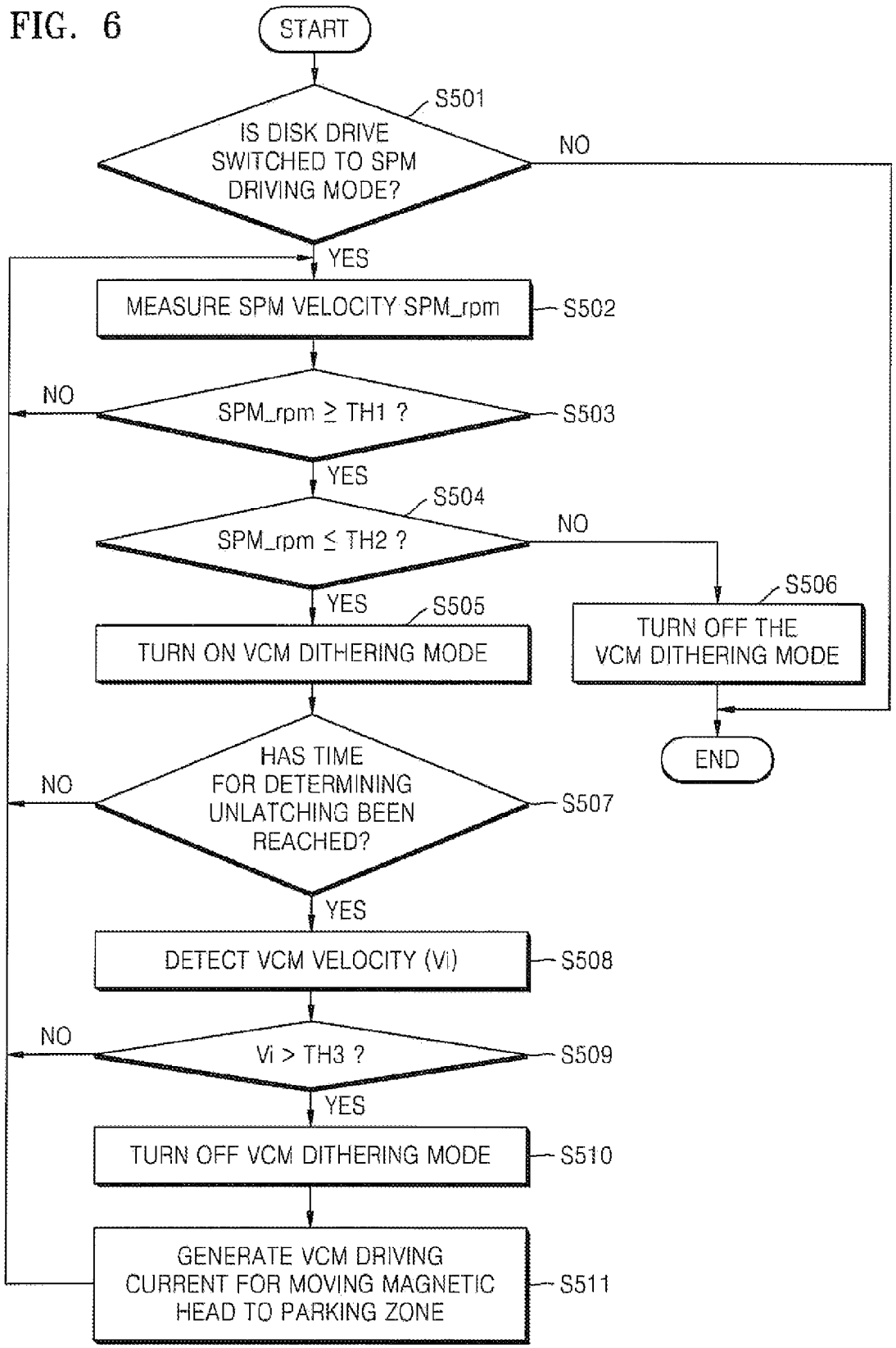
FIG. 6 is a flowchart of a method of reducing abrasion of a disk by using a dithering process according to another embodiment of the present invention.

FIG. 6 illustrates a method of reducing abrasion of a disk by using a dithering process according to a second embodiment of the present invention.

Figure 5:
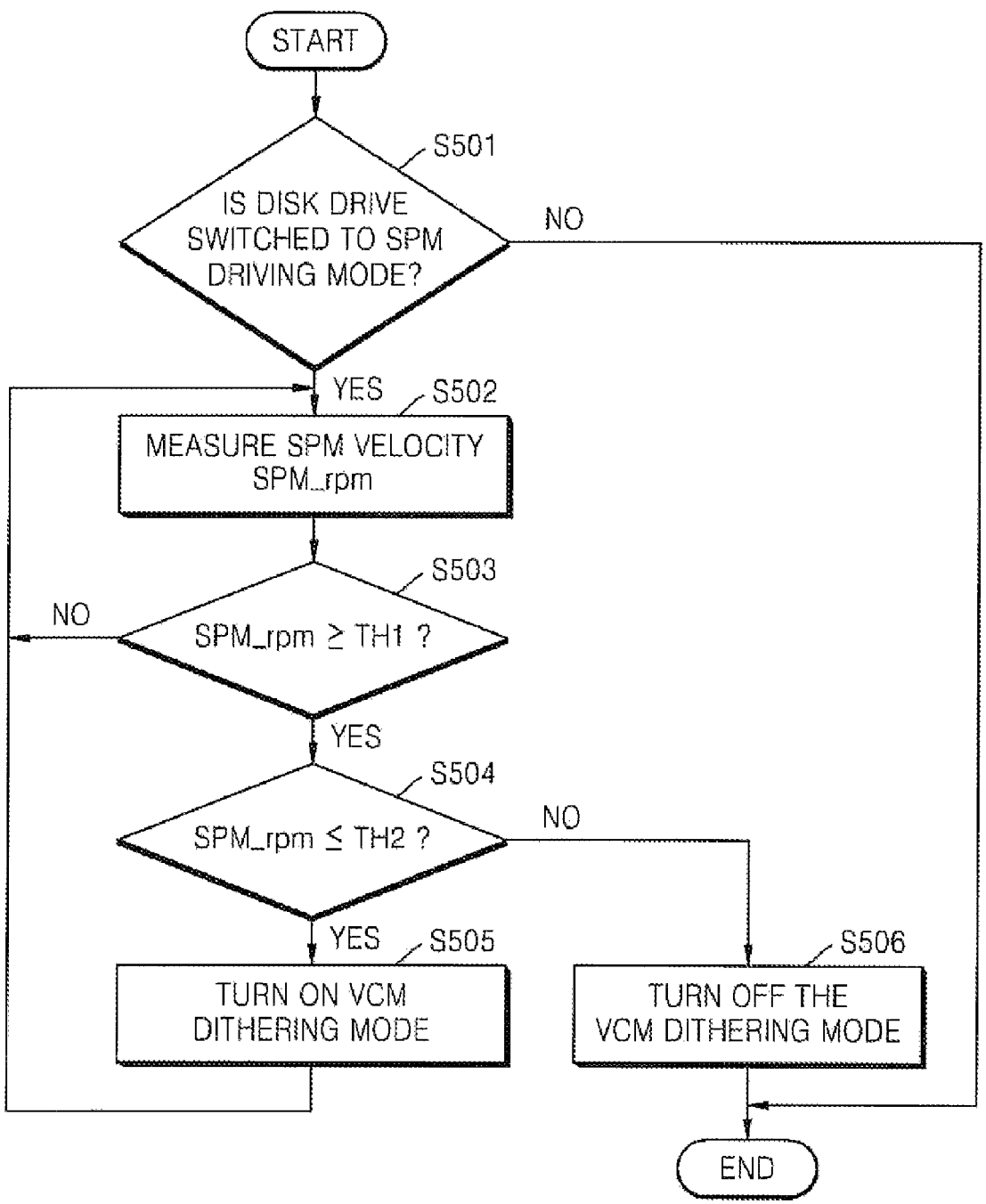
FIG. 5 is a flowchart of a method of reducing abrasion of a disk by using a dithering process according to an embodiment of the present invention.

Unlike the first embodiment illustrated in FIG. 5, the second embodiment illustrated in FIG. 6 takes into account whether the magnetic head 16 is abnormally parked in the data zone or unlatched from the parking zone of the disk 12.

Since operations S501 to S506 illustrated in FIG. 6 are the same as operations S501 to S506 illustrated in FIG. 5, a repeated description of operations S501 to S506 will be omitted. Accordingly, only processes not included in the flowchart of FIG. 5 will be described below.

The controller 42 determines whether a time for determining whether unlatching occurs is reached while executing the dithering process based on operation S505 (operation S507). For example, it is possible to periodically determine whether unlatching has occurred while executing the VCM dithering process at a predetermined time interval. In another example, it is possible to determine whether unlatching occurs at an initial time of the dithering process execution and at a predetermined time (e.g., when the amplitude of VCM DAC signal has a negative value) when a dithering control signal for moving the magnetic head 16 in the outer direction of the disk 12 is generated. Parking in the data zone may be a state in which unlatching occurs. The time when unlatching occurs will be further described with reference to FIGS. 8 and 9.

FIGS. 8 and 9 illustrate examples in which triangular and sinusoidal signals are used as a VCM DAC signal.

In FIGS. 8 and 9, T0 indicates a time when the SPM 14 starts to rotate. T1 indicates a time when the SPM velocity SPM_rpm reaches the first threshold velocity TH1. T4 indicates a time when the SPM velocity SPM_rpm reaches the second threshold velocity TH2. T5 indicates a time when the SPM velocity SPM_rpm reaches the target velocity Target_rpm. T2 indicates a time when a seek direction of the disk 12 is changed from the inner direction to the outer direction. T3 indicates a time when the seek direction of the disk 12 is changed from the outer direction to the inner direction. T4 indicates a time when the seek direction of the disk 12 is changed from the inner direction to the outer direction.

Accordingly, in FIGS. 8 and 9, the VCM dithering process is executed between T1 and T5. The magnetic head 16 is moved in the inner direction between T1 and T2 and between T3 and T4. The magnetic head 16 is moved in the outer direction between T2 and T3 and between T4 and T5.

In FIGS. 8 and 9, T2, T3, and T4 may be respectively defined as times when the SPM velocity SPM_rpm reaches predetermined velocities between the first and second threshold velocities TH1 and TH2. T2, T3, and T4 may be set to times having predetermined intervals with respect to T1.

In FIGS. 8 and 9, Ta, Tb, and Tc are examples of times for determining whether unlatching occurs. Ta is set to a relatively short time after T1 (the start of the dithering process). The time for determining whether unlatching occurs is set to Ta, so as to detect a case where the magnetic head 16 is abnormally parked in the data zone of the disk 12. When the magnetic head 16 is parked in the data zone of the disk 12, the disk drive may be fatally damaged. Accordingly, it is necessary to rapidly move the magnetic head 16 to the parking zone.

Tb and Tc are included in time periods in which the magnetic head 16 is moved in the outer direction. Tb and Tc correspond to times when the absolute values of the amplitudes of the VCM DAC signal reach near the maximum value. Thus, it is most likely that the magnetic head unlatches at Tb and Tc.

It is therefore effective to determine whether unlatching has occurred at times Ta, Tb, and Tc. In addition, such determination can be performed more than once at each predetermined time. For example, the determination can be performed twice at Ta and three times at each of Tb and Tc.

When the time for determining whether unlatching occurs has not been reached, the process returns to operation S502. When the time for determining whether unlatching occurs has arrived, an actuator velocity Vi is detected (operation S508). The VCM velocity Vi can be calculated by detecting counter-electromotive force of the VCM 30.

The counter-electromotive force of the VCM 30 can be measured by the VCM counter-electromotive force measurement unit 52 as described below.

Figure 4:
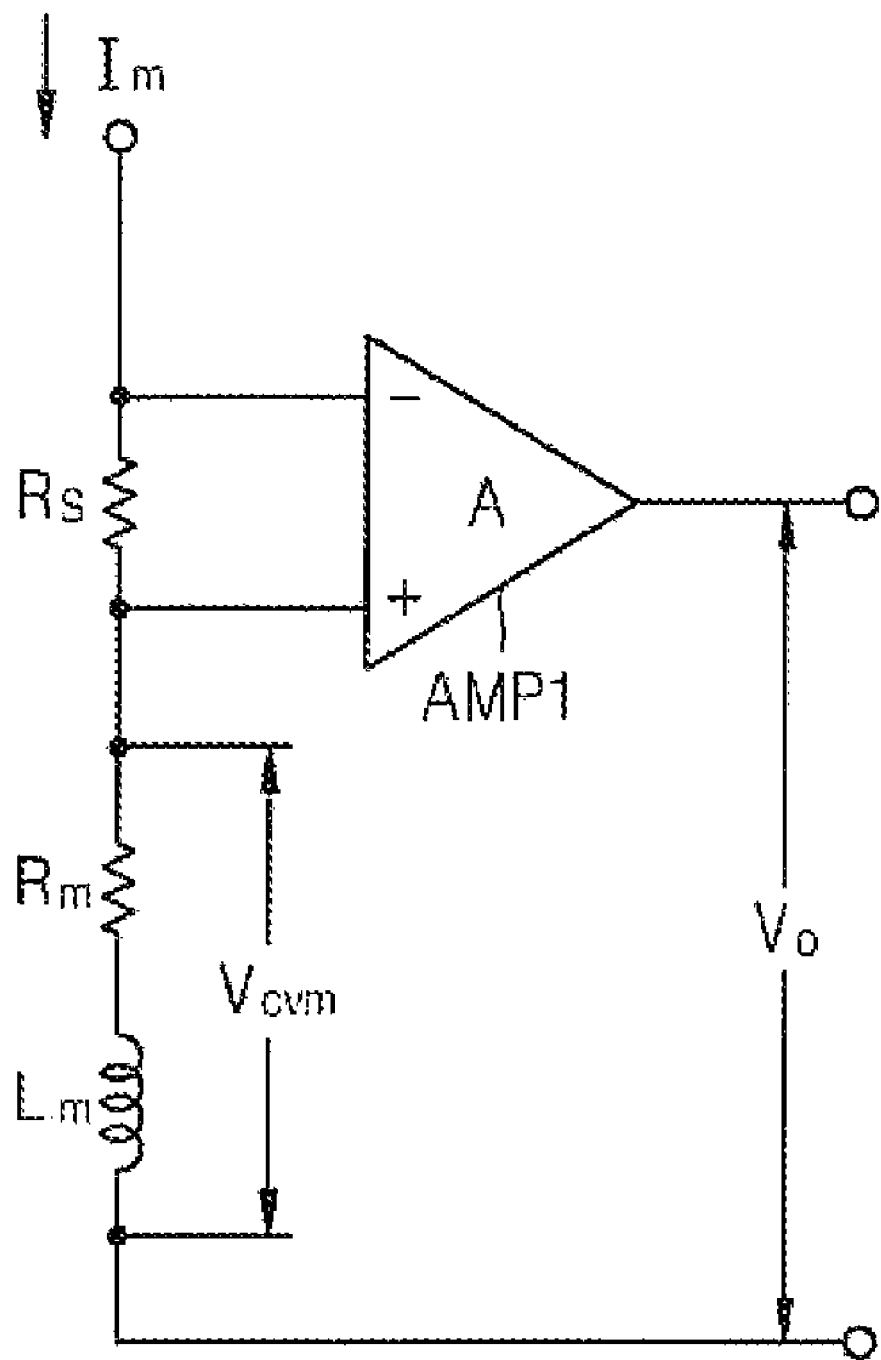
FIG. 4 is a detailed circuit diagram of a voice coil motor (VCM) counter-electromotive force measurement unit shown in FIG. 3.

FIG. 4 is a detailed circuit diagram of the VCM counter-electromotive force measurement unit 52. Rm indicates coil resistance of the VCM 30. Lm indicates coil inductance of the VCM 30. Rs indicates the resistance of a sensing resistor for detecting a current Im which flows in the VCM 30. A variable gain amplifier AMP1 serves to amplify a voltage drop over the sensing resistor Rs by a gain A.

The voltage Vvcm applied to the VCM 30 is represented by Equation 1 as follows:

$$Vvcm = (Lm \times dIm/dt) + (Rm \times Im) + Vbemf, \qquad \text{[Equation 1]}$$

where Vbemf is a voltage caused by the counter-electromotive force of the VCM 30.

Accordingly, an output voltage Vo of the VCM counter-electromotive force measurement unit 52 is represented by Equation 2.

$$Vo = (Lm \times dIm/dt) + (Rm \times Im) + Vbemf - (A \times Rs \times Im) \qquad \text{[Equation 2]}$$

When the current Im that flows in the VCM is assumed to be constant when measuring the counter-electromotive force, Equation 2 can be represented by Equation 3.

$$Vo = (Rm \times Im) + Vbemf - (A \times Rs \times Im) \qquad \text{[Equation 3]}$$
$$= Vbemf + [(Rm/Rs - A) \times Im \times Rs]$$

When a condition of Rm/Rs−A=0 is satisfied in Equation 3, the output voltage Vo of the counter-electromotive force measurement unit 52 becomes the counter-electromotive force Vbemf generated by the VCM 30.

Accordingly, since Rs is already known, when Rm is known, the counter-electromotive force value can be accurately measured by matching the gain A of the variable gain amplifier AMP1 with Rm/Rs.

When the counter-electromotive force Vbemf of the VCM 30 is multiplied by a proportional factor, the VCM velocity Vi is calculated.

Next, the controller 42 compares the calculated VCM velocity Vi with a threshold velocity TH3 (operation S509). The threshold velocity TH3 is a threshold velocity for determining a latched state or unlatched state. The threshold velocity may be determined as an intermediate value between the highest velocity value of the VCM 30 generated in the latched state and the lowest velocity value of the VCM generated in the unlatched state.

Since a case where the magnetic head 16 is parked in the data zone of the disk corresponds to the unlatched state, the determination on whether the magnetic head 16 is parked in the data zone of the disk 12 at the time Ta is the same as the determination on whether the magnetic head 16 is unlatched at the times Tb and Tc. In some cases, the determinations may be separately performed by setting the threshold values to different values.

When it is determined in operation S509 that the VCM velocity Vi exceeds the threshold velocity TH3, the VCM dithering mode is turned off (operation S510).

Then, since the aforementioned case corresponds to a case where unlatching occurs, the controller 42 generates a VCM driving current for moving the magnetic head 16 to the parking zone of the disk 12 and applies the generated VCM driving current to the VCM driving unit 48 (operation S511). Accordingly, the magnetic head 16 is moved in the inner direction and latched in the parking zone of the disk 12.

As described above, when the unlatched state occurs while executing the VCM dithering mode, the VCM dithering mode is temporarily turned off (operation S510). Then, the magnetic head 16 is moved to the parking zone of the disk 12 (operation S511) and the process returns to operation S502.

However, as the result of operation S509, when the VCM velocity Vi does not exceed the threshold velocity TH2, it corresponds to the case where unlatching does not occur. In this case, the process directly returns to operation S502.

Figure 10:
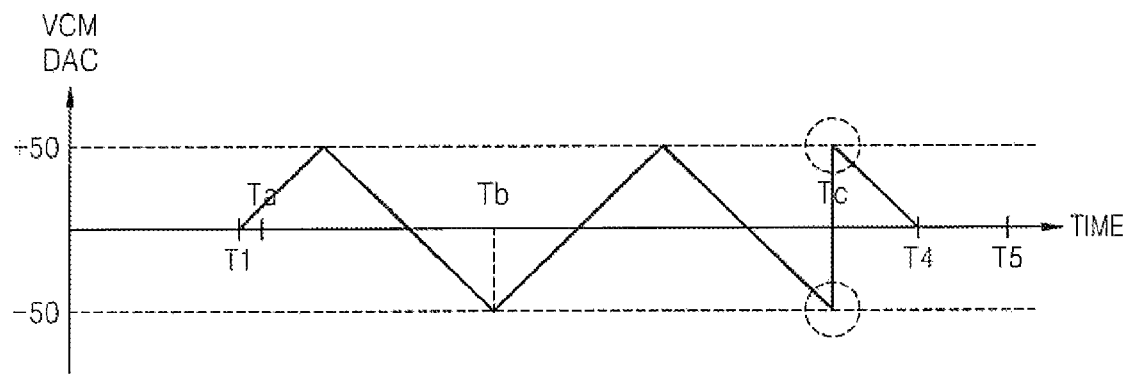
FIG. 10 is a timing diagram of a VCM DAC signal when an unlatch state occurs while executing a dithering process according to an embodiment of the present invention.

Referring to FIG. 10, immediately at the point in time when the unlatched state occurs at the time Tc, which is one of the times for determining whether unlatching occurs, the positive VCM DAC signal for moving the magnetic head 16 in the inner direction is generated.

Figure 11:
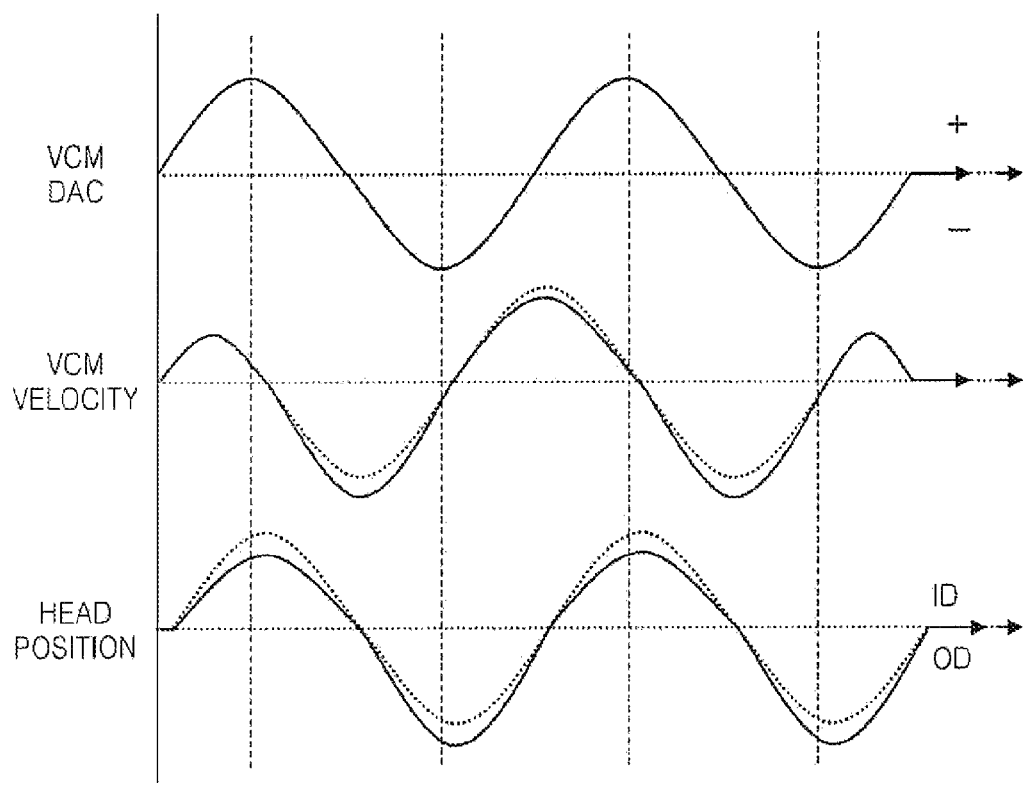
FIG. 11 illustrates a VCM velocity of a magnetic head according to a VCM DAC signal generated in a dithering process according to an embodiment of the present invention.

FIG. 11 illustrates a VCM velocity and a trajectory of a magnetic head according to a VCM DAC signal generated during a dithering process. Dotted lines indicate theoretical values. Solid lines indicate measured values. When in the latched state, the same force is applied to the rubber portion C used for the latch unit 38 in the inner and outer directions of the disk 12, and the compressed length of the rubber portion C is less than the extended length of the rubber portion C.

Figure 13:
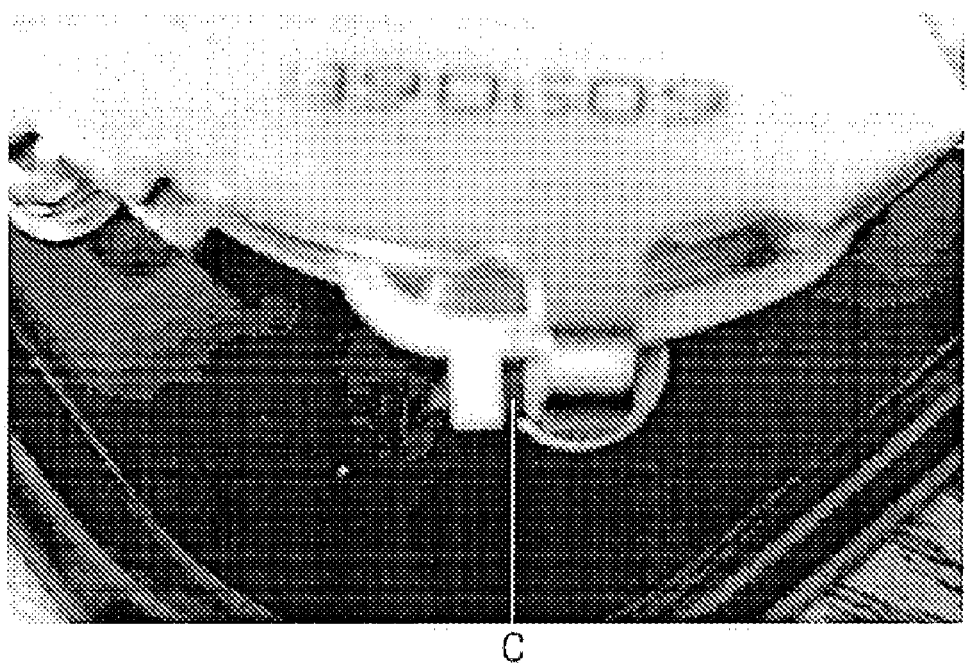
FIG. 13 illustrates a state in which a rubber portion C of the latch unit 38 is compressed when a VCM DAC signal for moving a magnetic head in the inner direction in a dithering process is generated, according to an embodiment of the present invention.
Figure 14:
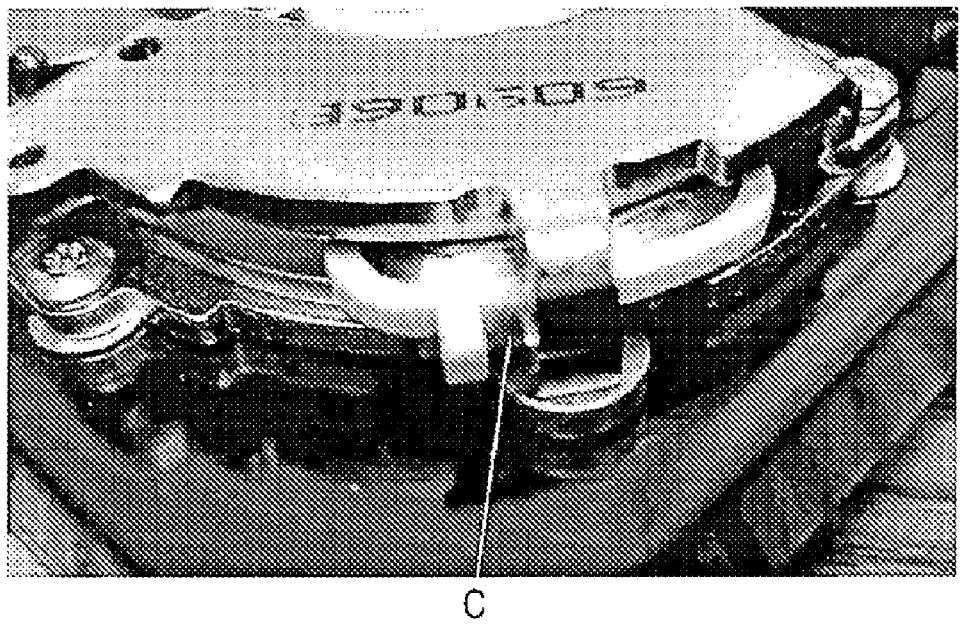
FIG. 14 illustrates a state in which a rubber portion C of the latch unit 38 is extended when a VCM DAC signal for moving a magnetic head in the outer direction in a dithering process is generated, according to an embodiment of the present invention.

FIG. 13 illustrates a state in which the rubber portion C of the latch unit 38 is compressed when the positive VCM DAC signal is applied. FIG. 14 illustrates a state in which the rubber portion C of the latch unit 38 is extended when the negative VCM DAC signal is applied. In FIGS. 13 and 14, it is known that a difference in the length of the rubber portion C of the latch unit 38 occurs. This illustrates that the magnetic head 16 moves in the latched state.

As described above, it is possible to minimize the damage of the disk and the damage of the magnetic head by minimizing the contact time during which the magnetic head contacts the same location of the disk when the magnetic head lifts from the surface of the disk by executing the dithering process so as to finely move the magnetic head, when the latched state is maintained and when the spindle motor starts to rotate and the spindle motor is accelerated.

When an abnormal state occurs, it is possible to reduce the damage of the disk by rapidly moving the magnetic head to the parking zone then restarting the dithering process. Such operation may be appropriate, for instance, when the magnetic head is parked in the data zone during the dithering process or even in a case where the unlatch state occurs.

The invention can be embodied as a method, apparatus, and a system, and the like. When the invention is executed as software, the elements of the present invention are code segments performing required processes. Programs or code segments can be stored in a processor-readable medium, or can be transmitted as a computer data signal combined with a carrier wave in a transmission medium or a communication network. A processor readable medium is any medium that can store information. Examples of the processor readable medium include electronic circuits, semiconductor memory elements, a read-only memory (ROM), a flash memory, an erasable ROM (EROM), floppy disks, optical disks, and hard disks. Computer data signals include any signal that can be propagated over transmission media such as electronic network channels, optical fibers, air, an electromagnetic system, an RF network, and the like.

While the present invention has been particularly shown and described with reference to exemplary embodiments thereof, it will be understood by those skilled in the art that various changes in form and details may be made therein without departing from the spirit and scope of the invention as defined by the appended claims. The exemplary embodiments should be considered in descriptive sense only and not for purposes of limitation. Therefore, the scope of the invention is defined not by the detailed description of the invention but by the appended claims, and all differences within the scope will be construed as being included in the present invention. For example, the invention may be applied to various data storage devices in addition to various disk drives including a hard disk drive.

What is claimed is:

1. A method for controlling a magnetic head of a disk drive, comprising:
   determining whether the disk drive is switched to a spindle motor driving mode;
   determining whether a spindle velocity is within a predetermined velocity range; and
   activating a dithering mode if it is determined that the disk drive is switched to the spindle motor driving mode and if it is determined that the spindle velocity is within the predetermined velocity range, the dithering mode alternatively driving the magnetic head in an inner direction and an outer direction with respect to a disk of the disk drive;
   determining whether the magnetic head is unlatched from a parking zone of the disk while executing the dithering mode; and
   if the magnetic head is unlatched from the parking zone, deactivating the dithering mode and driving the magnetic head to the parking zone.

2. The method of claim 1, wherein determining whether the spindle velocity is within the predetermined velocity range includes;
   measuring the spindle velocity;
   determining whether the measured spindle velocity is greater than or equal to a first threshold velocity; and
   determining whether the measured spindle velocity is less than or equal to a second threshold velocity.

3. The method of claim 2, wherein measuring the spindle velocity includes measuring a counter electromotive force of a spindle motor.

4. The method of claim 1, wherein activating a dithering mode includes generating a voice coil motor control signal having positive and negative values, the positive values driving the magnetic head in the inner direction, the negative values driving the magnetic head in the outer direction.

5. The method of claim 4, wherein the voice coil motor control signal begins with positive values.

6. The method of claim 4, wherein the voice coil motor control signal is a square waveform.

7. The method of claim 4, wherein the voice coil motor control signal is a triangular waveform.

8. The method of claim 4, wherein the voice coil motor control signal is a sinusoidal waveform.

9. The method of claim 1, further comprising, after driving the magnetic head to the parking zone, reactivating the dithering mode.

10. The method of claim 1, wherein determining whether the magnetic head is unlatched from a parking zone of the disk includes determining a time for detecting an unlatched state.

11. The method of claim 10, wherein the time for detecting an unlatched state is a relatively short amount of time after activating the dithering mode.

12. The method of claim 10, wherein the time for detecting an unlatched state is substantially coincident with a peak negative amplitude of a voice coil motor control signal associated with the dithering mode.

13. The method of claim 1, wherein determining whether the magnetic head is unlatched from a parking zone of the disk includes:
   detecting a velocity of a voice coil motor; and
   determining whether the detected velocity of the voice coil motor exceeds a predetermined threshold.

14. The method of claim 13, wherein detecting the velocity of the voice coil motor includes measuring a counter electromotive force of the voice coil motor.

15. A disk drive comprising:
   a disk that includes a parking zone and a data zone;
   a magnetic head intermittently coupled to the disk, the magnetic head configured to write information in the data zone of the disk or read information from the data zone of the disk;
   a voice coil motor coupled to the magnetic head and configured to position the magnetic head with respect to the disk;
   a voice coil motor counter-electromotive force measurement unit for measuring counter-electromotive force generated by the voice coil motor;
   a latch unit coupled to the magnetic head, the latch unit configured to constrain the magnetic head to the parking zone of the disk in a latch mode;
   a controller coupled to the magnetic head and the voice control motor, the controller configured to generate a dithering control signal for alternately moving the magnetic head in an inner direction and an outer direction with respect to the disk when the magnetic head is in the latch mode and when a rotational velocity of the disk is in a predetermined range during acceleration of the disk, determine whether the magnetic head is unlatched from the parking zone based on counter-electromotive force measured by the voice coil motor counter-electromotive force measurement unit, temporarily stop generation of the dithering control signal when it is determined that the magnetic head is unlatched from the parking zone, and generate a voice coil motor driving control signal moving the magnetic head to the parking zone and latching the magnetic head in the parking zone; and
   a voice coil motor driving unit coupled between the controller and the voice control motor, the voice control driving unit configured to generate a voice coil motor driving current based on the dithering control signal.

16. The disk drive of claim 15, wherein the latch unit includes:
   a metal protrusion; and
   a rubber portion disposed on the opposite side of an actuator arm on which the magnetic head is mounted.

17. The disk drive of claim 15, wherein the voice coil motor counter-electromotive force measurement unit comprises:
   a sensing resistor which is serially connected to a coil of the voice coil motor, the sensing resistor configured to detect a current that flows through the coil; and
   a variable gain amplifier coupled in parallel with the sensing resistor, the variable gain amplifier configured to amplify a voltage drop over the sensing resistor, the measured counter-electromotive force of the voice coil motor being based on a value of a voltage output from the variable gain amplifier.

18. A processor-readable recording medium having embodied thereon a computer program for executing a method, the method comprising:
   determining whether the disk drive is switched to a spindle motor driving mode;
   determining whether a spindle velocity is within a predetermined velocity range; and
   activating a dithering mode if it is determined that the disk drive is switched to the spindle motor driving mode and if it is determined that the spindle velocity is within the predetermined velocity range, the dithering mode alternatively driving the magnetic head in an inner direction and an outer direction with respect to a disk of the disk drive;
   determining whether the magnetic head is unlatched from a parking zone of the disk while executing the dithering mode; and
   if the magnetic head is unlatched from the parking zone, deactivating the dithering mode and driving the magnetic head to the parking zone.

* * * * *